US010554605B2

(12) United States Patent
Brunn et al.

(10) Patent No.: US 10,554,605 B2
(45) Date of Patent: Feb. 4, 2020

(54) DETERMINING A VISIBILITY OF AN ONLINE CONVERSATION FOR A NEW PARTICIPANT

(71) Applicant: HCL Technologies Limited, New Delhi (IN)

(72) Inventors: Jonathan F. Brunn, Logan, UT (US); Jennifer Heins, Raleigh, NC (US)

(73) Assignee: HCL Technologies Limited, New Delhi (IN)

( * ) Notice: Subject to any disclaimer, the term of this patent is extended or adjusted under 35 U.S.C. 154(b) by 29 days.

(21) Appl. No.: 16/026,856

(22) Filed: Jul. 3, 2018

(65) Prior Publication Data

US 2018/0331988 A1    Nov. 15, 2018

Related U.S. Application Data

(63) Continuation of application No. 14/700,955, filed on Apr. 30, 2015, now Pat. No. 10,069,777.

(51) Int. Cl.
*G06F 15/16* (2006.01)
*H04L 12/58* (2006.01)

(52) U.S. Cl.
CPC .............. *H04L 51/16* (2013.01); *H04L 51/32* (2013.01)

(58) Field of Classification Search
CPC ................................ H04L 51/16; H04L 51/32
USPC ........................................................ 709/206
See application file for complete search history.

(56) References Cited

U.S. PATENT DOCUMENTS

| 5,594,859 | A | 1/1997 | Palmer et al. |
| 7,003,795 | B2 | 2/2006 | Allen |
| 7,822,745 | B2 | 10/2010 | Fayyad et al. |
| 8,135,800 | B1 | 3/2012 | Walsh et al. |
| 8,484,478 | B2 | 7/2013 | Kent, Jr. et al. |
| 8,630,968 | B2 | 1/2014 | Sinha |
| 8,639,229 | B2 | 1/2014 | Apfel et al. |
| 8,656,288 | B2 | 2/2014 | Roger et al. |
| 8,707,184 | B2 | 4/2014 | Chen et al. |
| 8,756,278 | B2 | 6/2014 | Sittig et al. |
| 8,812,499 | B2 | 8/2014 | Sathish et al. |
| 8,825,778 | B2 | 9/2014 | DeLuca et al. |

(Continued)

FOREIGN PATENT DOCUMENTS

| EP | 1449369 B1 | 12/2010 |
| WO | 2012061318 | 5/2012 |
| WO | 2013052923 | 4/2013 |

OTHER PUBLICATIONS

List of IBM Patents or Patent Applications Treated as Related; Jul. 3, 2018.

(Continued)

*Primary Examiner* — Wing F Chan
*Assistant Examiner* — Joseph R Maniwang
(74) *Attorney, Agent, or Firm* — Brooks Kushman P.C.

(57) ABSTRACT

Determining a visibility of an online conversation for a new participant includes presenting a user interface (UI) to a group of users to allow each of the users in the group of users to specify tags, the tags defining relationships between each of the users, determining initial participants from the group of users for an online conversation on a social network, identifying, based on the tags, a subject for the online conversation with respect to each of the initial participants of the online conversation, and determining, based on the subject, a visibility of the online conversation for a new participant from the group of users.

20 Claims, 5 Drawing Sheets

(56) References Cited

U.S. PATENT DOCUMENTS

| | | |
|---|---|---|
| 2007/0053308 A1 | 3/2007 | DuMas et al. |
| 2008/0046458 A1 | 2/2008 | Tseng |
| 2008/0141146 A1 | 6/2008 | Jones et al. |
| 2010/0110160 A1 | 5/2010 | Brandt et al. |
| 2011/0016479 A1 | 1/2011 | Tidwell et al. |
| 2011/0282732 A1 | 11/2011 | Bax et al. |
| 2011/0307791 A1 | 12/2011 | Pierre et al. |
| 2012/0124139 A1 | 5/2012 | Dempski |
| 2012/0268553 A1 | 10/2012 | Talukder |
| 2013/0263021 A1 | 10/2013 | Dunn |
| 2013/0268377 A1 | 10/2013 | Jessup |
| 2014/0025734 A1 | 1/2014 | Griffin |
| 2014/0040761 A1 | 2/2014 | Liu et al. |
| 2014/0313282 A1 | 10/2014 | Ma |
| 2015/0156171 A1 | 6/2015 | Biswas |
| 2015/0256796 A1 | 9/2015 | Ma |
| 2015/0302098 A1 | 10/2015 | Hern |
| 2016/0189407 A1 | 6/2016 | Hodgson |

OTHER PUBLICATIONS

Peddinti et al; Cloak and Swagger: Understanding Data Sensitivity Through the Lens of User Anonymity; Polytechnic School of Engineering; 35th IEEE Symposium on Security and Privacy; pp. 1-16; May 2014.

Savage et al; Visualizing Targeted Audiences; University of California; COOP 2014—Proceedings of the 11th International Conference on the Design of Cooperative Systems; www.cs.ucsb.edu/~holl/pubs/Savage-2014-COOP.pdf; pp. 1-16; Jun. 2014.

DETERMINING A VISIBILITY OF AN ONLINE CONVERSATION FOR A NEW PARTICIPANT

BACKGROUND

The present invention relates to determining a visibility of an online conversation, and more specifically, to determining the visibility of the online conversation for a new participant.

A social network is a network based application to enable a user to create a user account. Once the user account is created, the user establishes connections with other users, such as friends, family, and colleagues in an online environment. Further, once the user is connected with other users, the user may initiate online conversations with each of the other users on the social network by uploading pictures, uploading a post, sending a message, updating status information, commenting on other user's information, initiating instant messages (IM), initiating a video chat, among other activities.

BRIEF SUMMARY

A method for determining a visibility of an online conversation for a new participant includes presenting a user interface (UI) to a group of users to allow each of the users in the group of users to specify tags, the tags defining relationships between each of the users, determining initial participants from the group of users for an online conversation on a social network, identifying, based on the tags, a subject for the online conversation with respect to each of the initial participants of the online conversation, and determining, based on the subject, a visibility of the online conversation for a new participant from the group of users.

A system for determining a visibility of an online conversation for a new participant includes a presenting engine to present a UI to a group of users to allow each of the users in the group of users to specify tags, the tags defining relationships between each of the users, an initial participant determining engine to determine initial participants from the group of users for an online conversation on a social network, a tag identifying engine to identify the tags for each of the initial participants associated with the online conversation, a subject identifying engine to identify, based on the tags, a subject for the online conversation with respect to each of the initial participants of the online conversation, a visibility determining engine to determine, based on the subject, a visibility of the online conversation for a new participant from the group of users, and a monitoring engine to monitor the online conversation on the social network.

A machine-readable storage medium encoded with instructions for determining a visibility of an online conversation for a new participant, the instructions executable by a processor of a system to cause the system to present a UI to a group of users to allow each of the users in the group of users to specify tags, the tags defining relationships between each of the users, identify, based on the tags, a subject for an online conversation with respect to each initial participant of the online conversation, and determine, based on the subject, a visibility of the online conversation for a new participant from the group of users.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for determining a visibility of an online conversation for a new participant, such that online conversations can be restricted to the correct users based on initial participants associated with the online conversation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a social network is a network based application to enable a user to create a user account and share information with other users via an online conversation. Often, an online conversation initiated between users may be presented in an activity stream. The activity stream displays the information shared between the users in a chronological order. The most recent information is displayed at the top of the activity stream. Further, the further down a user scrolls on the activity stream, the older the information.

While the activity stream displays the online conversations initiated between two users, social networks contain a lot of noise. With quick contributions to an online conversation by users of the social network, it is difficult to determine the correct scope or context for the online conversation. Further, the user needs to make decisions several times a day with how to initiate the online conversations. For example, the user may initiate the online conversation as a broad post. However, the broad post can accidentally expose information outside of an appropriate group of users.

This can led to attention management issues among other users who are the recipients of the online conversation. Further, this type of poor attention management results in loss of productivity.

The principles described herein include a method for determining a visibility of an online conversation for a new participant. Such a method includes presenting a user interface (UI) to a group of users to allow each of the users in the group of users to specify tags, the tags defining relationships between each of the users, determining initial participants from the group of users for an online conversation on a social network, identifying, based on the tags, a subject for the online conversation with respect to each of the initial participants of the online conversation, and determining, based on the subject, a visibility of the online conversation for a new participant from the group of users. Such a method allows multiple overlapping or exclusive groups to be defined naturally among multiple users of a social network without coordination. As a result, the method allows online conversations to be restricted to the correct users based on the initial group of the online conversation.

In the present specification and in the appended claims, the term "group of users" means a number of users on a social network that have specified tags for each of the other users on the social network. The group of users may be a number of users socially connected to initial participants.

In the present specification and in the appended claims, the term "tags" means defined relationships specified by users for each user in a group of users of a social network. The tags may be labels specifically defined by each of the users for all other users they are socially connected to on a social network.

In the present specification and in the appended claims, the term "initial participants" means at least two users from a group of users initiating an online conversation. The initial participants may be implicitly or explicitly defined.

In the present specification and in the appended claims, the term "online conversation" means communication between a number of users on a social network. Users may initiate online conversations by uploading pictures, uploading a post, sending a message, updating status information, commenting on other user's information, initiating instant messages (IM), initiating a video chat, creating a forum post, commenting on a post, mentioning another user in a post using symbols and user names such as @username, among other activities.

In the present specification and in the appended claims, the term "subject" means a topic related to an online conversation from a perspective of each participant of the online conversation. The subject may be determined based on the tags associated with the initial participants.

In the present specification and in the appended claims, the term "visibility" means an extent to which a new participant may access an online conversation. The visibility may permit or restrict the new participant from accessing the online conversation.

In the present specification and in the appended claims, the term "new participant" means a user from a group of users that is not associated with an online conversation initiated by initial participants. A determining system may determine if it is appropriate for the new participant to access the online conversation.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
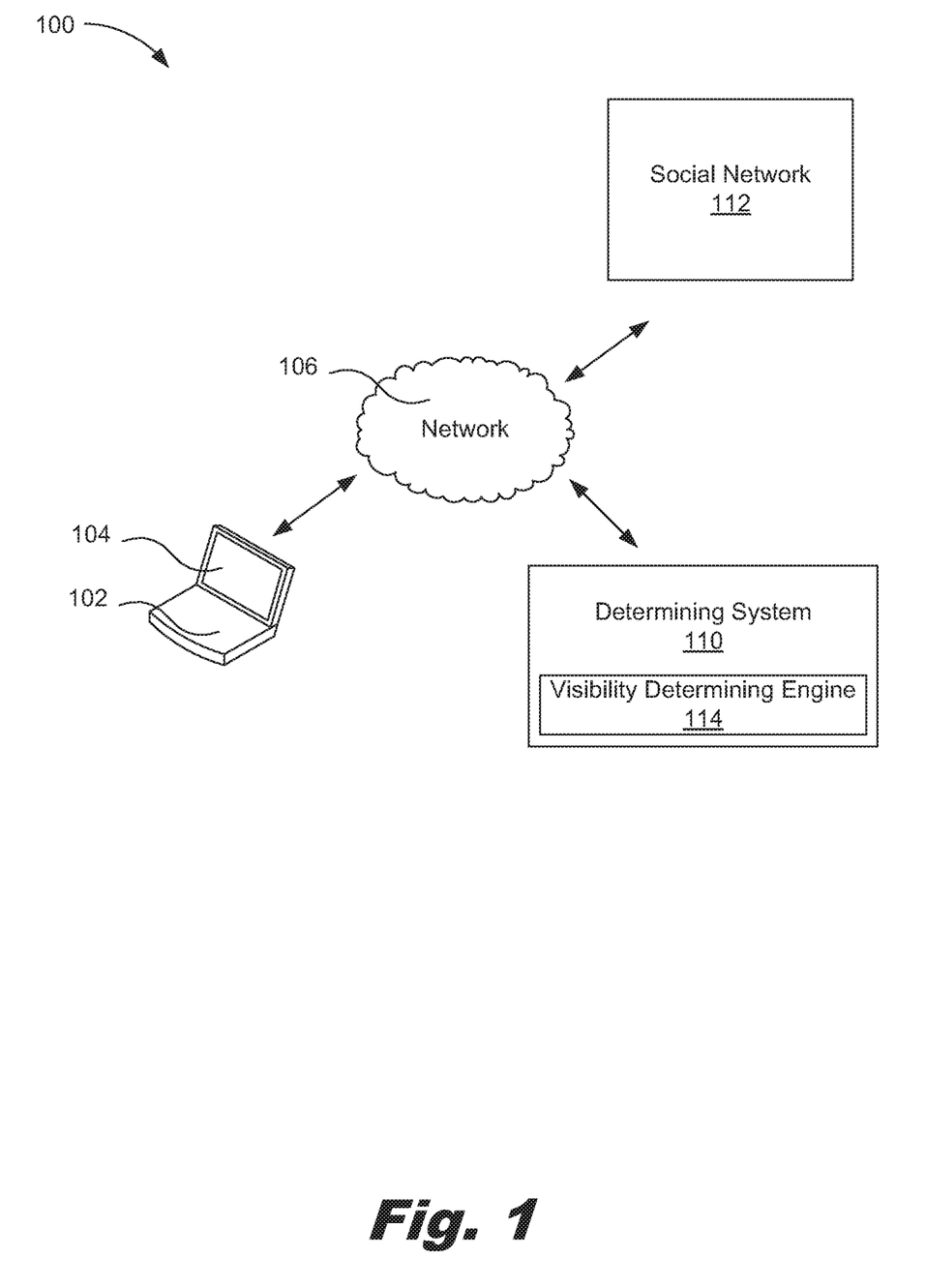
FIG. 1 is a diagram of an example of a system for determining a visibility of an online conversation for a new participant, according to one example of principles described herein.

Referring now to the figures, FIG. 1 is a diagram of an example of a system for determining a visibility of an online conversation for a new participant, according to one example of principles described herein. As will be described below, a determining system is in communication with a network to present a UI to a group of users to allow each of the users in the group of users to specify tags, the tags defining relationships between each of the users. Further, the determining system determines initial participants from the group of users for an online conversation on a social network. The determining system identifies, based on the tags, a subject for the online conversation with respect to each of the initial participants of the online conversation. Further, the determining system determines, based on the subject, a visibility of the online conversation for a new participant from the group of users.

As illustrated in FIG. 1, the system (100) includes social network (112). The social network (112) is a network based application to enable a user to create a user account. Once the user account is created, the user establishes connections with other users, such as friends, family, and colleagues in an online environment. Further, once the user is connected with other users, the user may initiate online conversations with each of the other users on the social network (112) by uploading pictures, uploading a post, sending a message, updating status information, commenting on other user's information, initiating IM, initiating a video chat, among other activities.

As illustrated in FIG. 1, the system (100) includes a user device (102). The user device (102) allows users of the social network (112) to access the social network (112), create user accounts, establish connections with other users, and initiate online conversations. As will be described below, the display (104) of the user device (102) is used to display information associated with the online conversations of the social network (112). This may include displaying the online conversation in an activity stream, as a video via a graphical user interface (GUI), as an IM, or other mechanisms to display the online conversation for the social network (112).

The system (100) further includes a determining system (110). The determining system (110) may be in communication with the social network (112) and the user device (102) over a network (106). As will be described below, the determining system (110) identifies a defining characteristic for an online conversation with respect to each user of the online conversation and uses the defining characteristic to restrict the visibility of the online conversation to new participants.

The determining system (110) presents a UI to a group of users to allow each of the users in the group of users to specify tags, the tags defining relationships between each of the users. As will be described below, the tags are specific to each of the users in the group of users.

The determining system (110) determines initial participants from the group of users for an online conversation on a social network. The initial participants may be at least two users from the group of users initiating an online conversation.

Further, the determining system (110) identifies, based on the tags, a subject for the online conversation with respect to each of the initial participants of the online conversation. The subject may be a topic related to the online conversation that defines the online conversation from the perspective of each initial participant.

A visibility determining engine (114) of the determining system (110) determines, based on the subject, a visibility of the online conversation for a new participant from the group of users. The visibility includes permitting the new participant to access the online conversation, restricting the new participant from accessing the online conversation, or reprioritizing the online conversation for the new participant. Such a system allows multiple overlapping or exclusive groups to be defined naturally among multiple users of the social network (112) without coordination. As a result, the system allows online conversations to be restricted to the correct users based on the initial group of the online conversation. More information about the determining system (110) will be described later on in this specification.

While this example has been described with reference to the determining system being located over the network, the determining system may be located in any appropriate location according to the principles described herein. For example, the determining system may be located in a user device, a server, a datacenter, other locations, or combinations thereof.

Figure 2:
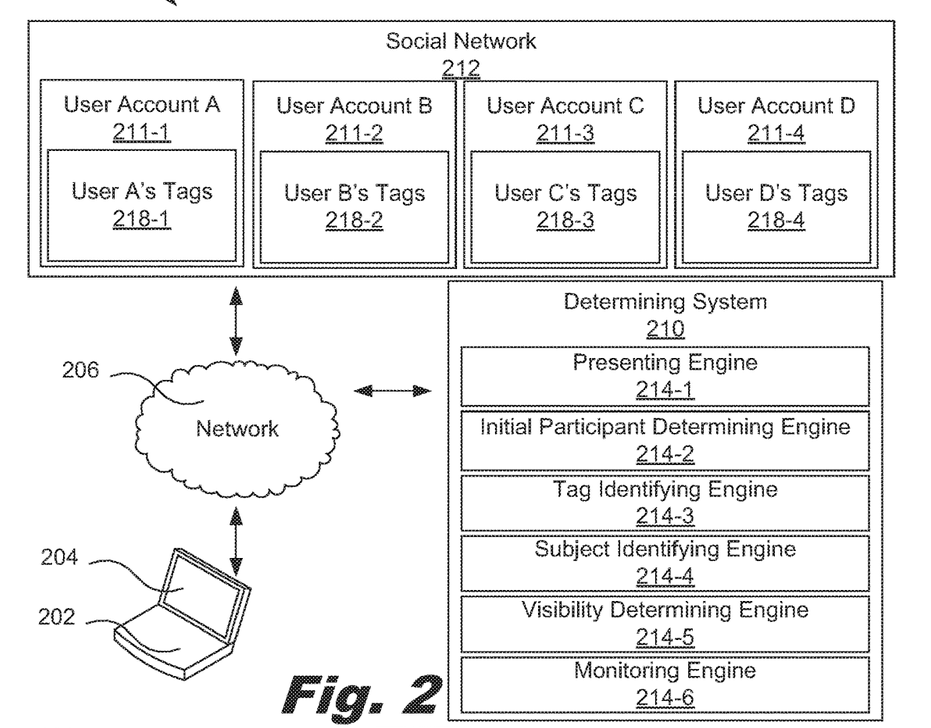
FIG. 2 is a diagram of an example of a system for determining a visibility of an online conversation for a new participant, according to one example of principles described herein.

FIG. 2 is a diagram of an example of a system for determining a visibility of an online conversation for a new participant, according to one example of principles described herein. As will be described below, a determining system is in communication with a network to present a UI to a group of users to allow each of the users in the group of users to specify tags, the tags defining relationships between each of the users. Further, the determining system determines initial participants from the group of users for an online conversation on a social network. The determining system identifies, based on the tags, a subject for the online conversation with respect to each of the initial participants of the online conversation. Further, the determining system determines, based on the subject, a visibility of the online conversation for a new participant from the group of users.

As illustrated in FIG. 2, the system (200) includes social network (212). The social network (212) may be a traditional social network, a blog, a forum, wikis, used by the public, used by a specific company, or another type of social network.

The social network (212) may include a number of user accounts (211). The user accounts (211) may include user account A (211-1), user account B (211-2), user account C (211-3), and user account D (211-4). Further, each of the user accounts (211) may be associated with a user or a several users. For example, account A (211-1) may be associated with user A. User account B (211-2) may be associated with user B. User account C (211-3) may be associated with user C. Further, user account D (211-4) may be associated with user D.

As illustrated, each of the user accounts (211) includes tags (218). Account A (211-1) may include user A's tags (218-1). User A's tags (218-1) may specify a relationship user A has with user B, user C, and user D. User A's tags (218-1) may specify that user A has a work and friend relationship with user B, a work relationship with user C, and a work relationship with user D. Further, these terms of work and friend defining the relationships between user A and other users may be specifically chosen or defined by user A.

User account B (211-2) may include user B's tags (218-2). User B's tags (218-2) may specify a relationship user B has with user A, user C, and user D. User B's tags (218-2) may specify that user B has a company X relationship with user A, a company X relationship with user C, and a friend relationship with user D. Further, these terms of company X and friend defining the relationships between user B and other users may be specifically chosen or defined by user B.

User account C (211-3) may include user C's tags (218-3). User C's tags (218-3) may specify a relationship user C has with user A, user B, and user D. User C's tags (218-3) may specify that user C has a colleague relationship with user A, a colleague relationship with user B, and a colleague relationship with user D. Further, these term colleague defining the relationships between user C and other users may be specifically chosen or defined by user C.

Further, user account D (211-4) may include user D's tags (218-4). User D's tags (218-4) may specify a relationship user D has with user A, user B, and user C. User D's tags (218-4) may specify that user D has a work relationship with user A, a childhood friend relationship with user B, and a colleague relationship with user C. Further, these terms of work, childhood friend, and colleague defining the relationships between user D and other users may be specifically chosen or defined by user D.

The tags (218) may be found within an ontology, information hierarchy, or dictionary. The tags (218) may be replaced with synonyms to normalize the language used in the tags (218). In an example, the most precise level which is common among all tags from an information hierarchy may be used in place of a tag if no common tag is found for all other users from the perspective of any single user. For example, if user A tags user B with project Y, and project Y is known to occur in organization Z, organization Z may be used in place of project Y as the tag if it results in the selection of a subject for the conversation from the perspective of user A.

As a result, user A may initiate an online conversation with user B both in the context of work and as a friend in their personal lives. User A, user B, and user C may initiate an online conversation in the context of work. As will be described below, if user A, user B and user C converse in an online conversation such as a posting to a forum or wall, or join an online meeting, video conference, or IM, a determining system (210) uses their existing relationships as defined privately by each member of the online conversation to restrict new participants in the online conversation. If user A and user B are talking in an online conversation, then the determining system (210) doesn't know the online conversation is about work, and permits other users to join or see the online conversation, but as soon as user C joins the online conversation, the determining system (210) restricts access to the online conversation, because the online conversation it is about work from the perspective of user A, company X from the perspective of user B, and colleague from the perspective of user C. This can be applied not just to broad tags like work and friend, but to tags indicating project relationships or subject matter expertise in an organization. As will be described below, using these tags the determining system (210) determines a subject of an online conversation. Further, the subject may be used to restrict new participates from joining the online conversation.

As illustrated in FIG. 2, the system (200) includes the user device (202). The user device (202) allows users of the social network (212) to access the social network (212), create user accounts, establish connections with other users, and share information. The display (204) of the user device (202) is used to display information associated with the online conversations of the social network (212). This may include displaying the online conversation in an activity stream, as a video via GUI, as an IM, or other mechanisms to display the online conversation for the social network (212).

The system (200) further includes the determining system (210). In one example, the determining system (210) includes a processor and computer program code. The computer program code is communicatively coupled to the processor. The computer program code includes a number of engines (214). The engines (214) refer to program instructions for performing a designated function. The computer program code causes the processor to execute the designated function of the engines (214). In other examples, the engines (214) refer to a combination of hardware and program instructions to perform a designated function. Each of the engines (214) may include a processor and memory. The program instructions are stored in the memory and cause the processor to execute the designated function of the engine. As illustrated, the determining system (210) includes a presenting engine (214-1), an initial participant determining engine (214-2), a tag identifying engine (214-3), a subject identifying engine (214-4), a visibility determining engine (214-5), and a monitoring engine (214-6).

As will be described below, the determining system (210) purpose is for controlling access to an online conversation and for attention management purposes by filtering uninteresting online conversations from view of certain users. The latter case is especially interesting in the context of attention management for activity streams and prioritization of notifications. Users who have not yet commented on an update in a news feed may or may not see the update and ensuing online conversation. The determining system (210) determines visibility based on the tags directed at the user by current participants in the online conversation. The appearance of an online conversation in a user's new feed depends on the tags applied to the users by the initial participants of the online conversation.

Turning specifically to the engines (214). The presenting engine (214-1) presents a UI to a group of users to allow each of the users in the group of users to specify tags, the tags defining relationships between each of the users. The determining system (210) allows multiple overlapping or exclusive groups to be defined naturally among multiple users of a social network (212) without coordination. The determining system (210) does not reveal relationships between users as would be necessary if static groups were defined across users with a single authoritative source for the group definition.

As a result, the users do not need to coordinate their group or relationship definitions via the determining system (210). Each user defines their relationships to each other user for their own use. These relationships do not need to be visible to other users for the determining system (210) to function. These relationships can take the form of personal groups or personal tags. As mentioned above, each user has used their own terminology for their own tagging or groups and these may be kept private. The relationships or tags may also be created to represent subgroups or relationships in an organization. As a result, the tags are specific to each of the users in the group of users.

The initial participant determining engine (214-2) determines initial participants from the group of users for an online conversation on a social network. The initial participants may be defined by a threshold number of users to comment on a post. For example, if the threshold is three, the first three users to comment on a post are determined to be initial participants of an online conversation. In other examples the initial set of participants defining the threshold may not be fixed. The determining system (210) can reanalyze the context of a conversation as participants join and leave the online conversation. In some situations the determining system (210) may not only recognize a changing subject as participants join and leave the online conversation, but the determining system (210) may identify a changing subject based on the relationships of the participants.

The initial participants may be defined by specific characters in an online conversation. The special characters may be defined by a symbol followed by a user's username. For example, @username. The special characters may be presented in a status update of an online conversation. The initial participants may be defined by other criteria from the original poster. Further, the initial participants may be defined by explicit invitations.

If using an implicit mechanism such as a threshold, the online conversation may initially be shown to all users and may be de-prioritized for display to other users, for instance, for display on a news feed, as the online conversation progresses and more users comment or join the online conversation. In this case, the determining system (210) functions as a form of attention management and not just access control.

The tag identifying engine (214-3) identifies the tags for each of the initial participants associated with the online conversation. For example, if user A and user B are initial participants associated with the online conversation, the tag identifying engine (214-3) identifies user A's tags (218-1) and user B's tags (218-2). If user A, user B and user C are initial participants associated with the online conversation, the tag identifying engine (214-3) identifies user A's tags (218-1), user B's tags (218-2), and user C's tags (218-3).

The subject identifying engine (214-4) identifies, based on the tags, a subject for the online conversation with respect to each of the initial participants of the online conversation. For example, if user A, user B, user C are initial participants associated with the online conversation, the subject identifying engine (214-4) identifies, based on user A's tags (218-1), user B's tags (218-2), and user C's tags (218-3), a subject for the online conversation with respect to each of the initial participants of the online conversation. From user's A perspective the subject is work as described by user A's tags as defined above. From user B's perspective the subject is company X as described by user B's tags as defined above. From user C's perspective the subject is colleague as described by user C's tags as defined above.

The visibility determining engine (214-5) determines, based on the subject, a visibility of the online conversation for a new participant from the group of users. The visibility includes permitting the new participant to access the online conversation, restricting the new participant from accessing the online conversation, or reprioritizing the online conversation for the new participant. For example, user D may not be part of the initial participants. Depending on the subject of the online conversation, user D may or may not be permitted to view the online conversation. If the user tags (218) specify user D is a friend with user A, user B, and user C, and the online conversation's is about work from the perspectives of user A, user B, and user C, user D may be restricted from accessing the online conversation. User D is be restricted from accessing the online conversation because user A, user B or user C's tags specify a relationship with user D that is not representative of the conversation from the perspective of user A, user B or user C. Alternatively, if the online conversation is displayed via an activity stream, the online conversation may be deprioritized and displayed at the bottom of the activity stream. However, if the online conversation's subject is friends from the perspective of user A and/or user B and/or user C, user D may be permitted to access the online conversation. In an example, a new participant can view the online conversation if they have access to the uniform resource locator (URL) of the online conversation.

The visibility is further based on a tolerant mode. The tolerant mode allows the new participant to access the online conversation if at least one of the tags of at least one of the initial participants defines a subject for which the new participant is also tagged. For example, user D needs to be labeled, via the tags, with work by user A or company X by user B, or colleague by user C since these are the defining characteristics of the online conversation from each initial participant's perspective.

The visibility is further based on a strict mode. The strict mode allows the new participant to access the online conversation if at least one of the tags from all of the initial participants for the new participant matches the subject of the online conversation. For example, user D needs to be labeled, via the tags, with work by user A and company X by user B, and colleague by user C since these are the defining characteristics of the online conversation from each initial participant's perspective.

In some example, the determining system (210) may operate in tolerant mode or strict mode depending on the number of initial participants. For example, if two initial participants are associated with an online conversation, the determining system (210) may operate in strict mode. If several initial participants are associated with an online conversation, the determining system (210) may operate in tolerant mode. The determining system (210) may switch between tolerant mode or strict mode automatically. In some example, the determining system (210) may operate in tolerant mode or strict mode based on a threshold associated with participants. The participants may be initial participants and/or new participants. The threshold may include a defined number of participants such as ten for each online conversation. If at least ten participants are associated with an online conversation, the determining system (210) may operate in tolerant mode or strict mode according to the determining system's desired operation. The threshold may include a percentage of participants such as twenty percent. For example, if at least twenty percent participants associated with an online conversation are new participants, the determining system (210) may operate in tolerant mode or strict mode according to the determining system's desired operation. Further, the determining system (210) may operate in tolerant mode or strict mode based on the type of social network. For example, strict mode works best when all relationships are completely well defined, as may be the case in a government agency or rigid organization. Tolerant mode is more appropriate for most social applications.

The visibility is further based on a minimum mode. The minimum mode may determine a visibility of the online conversation for a new participant based on a minimum number of initial participants tagging a new participant with a valid tag. For example, if there are twenty initial participants in the online conversation the minimum mode may specify that the new participant is permitted to view the online conversation if the new participant's tags are valid with respect to at least three of the twenty initial participants. If the new participant's tags are not valid with respect to at least three of the twenty initial participants, the new participant is restricted from accessing the online conversation.

The visibility is further based on a percent mode. The percent mode may determine a visibility of the online conversation for a new participant based on a percentage of initial participants tagging a new participant with a valid tag. For example, if there are twenty initial participants in the online conversation the percent mode may specify that the new participant is permitted to view the online conversation if the new participant's tags are valid with respect to at least fifty percent of the twenty initial participants. If the new participant's tags are not valid with respect to at least fifty percent of the twenty initial participants, the new participant is restricted from accessing the online conversation.

Further, the visibility is based on the new participant being socially connected to none of the initial participants, some of the initial participants, or each of the initial participants. As a result, visibility of initial participants to a new participant may demand that the new participant to be socially connected to all the initial participants.

Further, the visibility is based on the new participant and a subgroup of the initial participants having a common tag. Visibility of the initial participants to a new participant demands that for an originating user A of the initial participants, all other user such as user A, user B, and user C are part of a single circle or group G of originating user A. For example, each initial participant must have some common relationship with all other initial participants. User A and user B may be work colleagues. Further, user A, user C, and user D are tagged as family by each other. As a result, the online conversation of user A, user C, and user D would not be instantly visible to user B. However, an online conversation of user A and user C would be instantly visible to user D.

The monitoring engine (214-6) monitors the online conversation on the social network (212). If the online conversation is modified, for example by deleting an initial participant from the online conversation, the monitoring engine (214-6) may alert the determining system (210) to modify the subjects of the online conversation. As a result, the visibility of the online conversation may be modified.

An overall example of FIG. 2 will now be described. The presenting engine (214-1) presents a UI to a group of users to allow each of the users in the group of users to specify tags, the tags defining relationships between each of the users. The users specify the tags as described above. The initial participant determining engine (214-2) determines initial participants from the group of users for an online conversation on a social network. The initial participants may be user A, user B, and user C. The tag identifying engine (214-3) identifies the tags for each of the initial participants associated with the online conversation as described above. The subject identifying engine (214-4) identifies, based on the tags, a subject for the online conversation with respect to each of the initial participants of the online conversation as work. The visibility determining engine (214-5) determines, based on the subject, a visibility of the online conversation for user D from the group of users as restricted from accessing the online conversation. The monitoring engine (214-6) monitors the online conversation on the social network. If a modification is made to the initial participants, user D may be permitted to access the online conversation.

Figure 3:
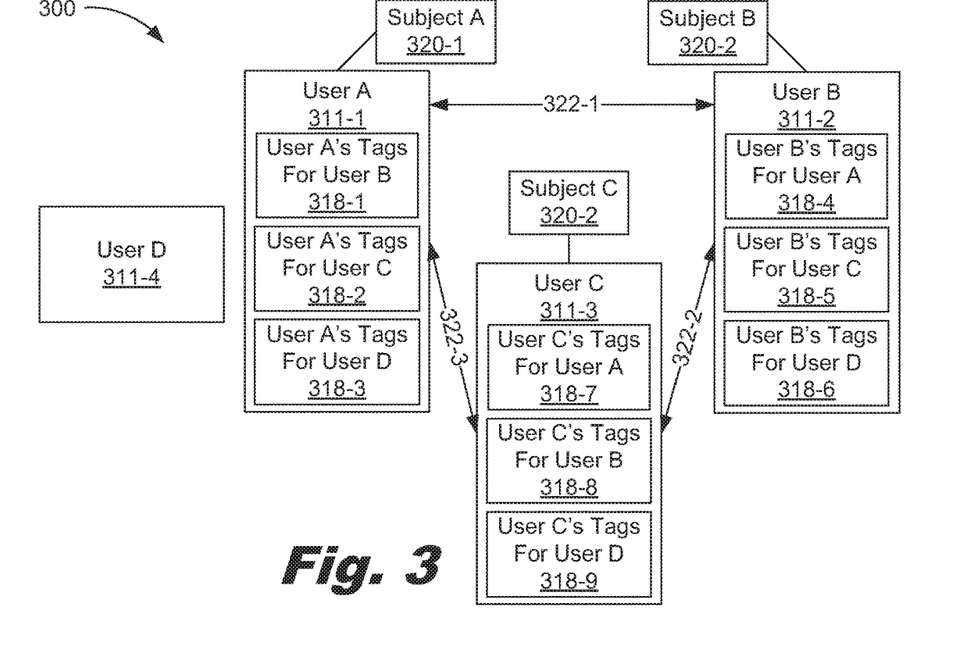
FIG. 3 is a diagram of an example of an online conversation, according to one example of principles described herein.

FIG. 3 is a diagram of an example of an online conversation, according to one example of principles described herein. As will be described below, each user has the potential to be labeled by other users through the use of tags and various types of public and private groups. For each user in an online conversation, the online conversation has a subject which is derived from the tags given by that particular user to other users in the online conversation.

In an online conversation between user A (311-1), user B (311-2) and user C (311-3), the diagram (300) represents the relationships between these users. User A (311-1) has tagged, by labeling or placing, user B (311-2) in groups with work and friend as defined by user A's tags for user B (318-1). User A (311-1) has tagged, by labeling or placing, user C (311-3) in groups with work as defined by user A's tags for user C (318-2). Since user A (311-1) has tagged both user B (311-2) and user C (311-3) with work, but not with friend, the defining system of FIG. 2 determines that the online conversation is about work from user A's perspective if all three users are in an online conversation as indicated by the arrows 322-1 and 322-3. As a result, subject A (320-1) may be work from user A's perspective. However, if user A (311-1) and user B (311-2) are in an online conversation as represented by arrow 322-1, subject A (320-1) may be work or friend from user A's perspective. Further, user A (311-1)

has tagged, or labeled or tagged or placed user D (311-4), a new participant, in groups with work as defined by user A's tags for user D (318-4).

User B (311-2) has tagged, by labeling or placing, user A (311-1) in groups with company X as defined by user B's tags for user A (318-4). User B (311-2) has tagged, by labeling or placing, user C (311-3) in groups with company X as defined by user B's tags for user C (318-5). Since user B (311-1) has tagged both user A (311-1) and user C (311-3) with company X the defining system of FIG. 2 determines that the online conversation is about company X from user B's perspective if all three users are in an online conversation as indicated by the arrows 322-1 and 322-3. As a result, subject B (320-2) may be company X from user B's perspective. Further, user B (311-2) has tagged, by labeling or placing, user D (311-4), the new participant, in groups with friend as defined by user B's tags for user D (318-6).

User C (311-3) has tagged, by labeling or placing, user A (311-1) in groups with colleague as defined by user C's tags for user A (318-7). User C (311-3) has tagged, by labeling or placing, user B (311-2) in groups with colleague as defined by user C's tags for user B (318-8). Since user C (311-3) has tagged both user A (311-1) and user B (311-2) with colleague the defining system of FIG. 2 determines that the online conversation is about colleagues from user C's perspective if all three users are in an online conversation as indicated by the arrows 322-1 and 322-3. As a result, subject C (320-3) may be colleague from user C's perspective. Further, user C (311-2) has tagged, by labeling or placing, user D (311-4), the new participant, in groups with colleague as defined by user C's tags for user D (318-9). Further, user B (311-2) and user C (311-3) may not be aware of the tags user A (311-1) has given to them and user A (311-1) is not aware of the tags given by user B (311-2) or user C (311-3).

The determining system uses these tags (318) and the subjects (320) to control who which users can see and/or join the online conversation. Now user D (311-4), the new participant, wants to join the online conversation and the determining system of FIG. 2 is utilized. In this example, the new participant's visibility of the online conversation may be controlled by relationships, as defined by the tags (318), with the other users already in the online conversation. User D (311-4) has relationships with user A (311-1), user C (311-3), and user B (311-2). However, the determining system of FIG. 2 is to decide does user D (311-4) have some common relationship with at least one, or possibly all, users from the perspective of one, or all, of the initial participants as described above. The determining system of FIG. 2 determines if the user D (311-4) can see the online conversation, be it a thread in a social network, a chat, e-meeting or other online conversation.

In this example, when the determining system of FIG. 2 is working in tolerant mode, the user D (311-4) needs to be either labeled with work by user A (311-1) or company X by user B (311-2) or colleague by user C (311-3) since these are the defining characteristics of the online conversation from each user's perspective. If user D (311-4) is labeled appropriately, user D (311-4) may access the online conversation. Alternatively, if user D (311-4) is not labeled appropriately, user D (311-4) may not access the online conversation.

In strict mode, user D (311-4) needs to be labeled as work by user A (311-1) and company X by user B (311-2) and colleague by user C (311-3). If user D (311-4) is labeled appropriately, user D (311-4) may access the online conversation. Alternatively, if user D (311-4) is not labeled appropriately, user D (311-4) may not access the online conversation.

Figure 4:
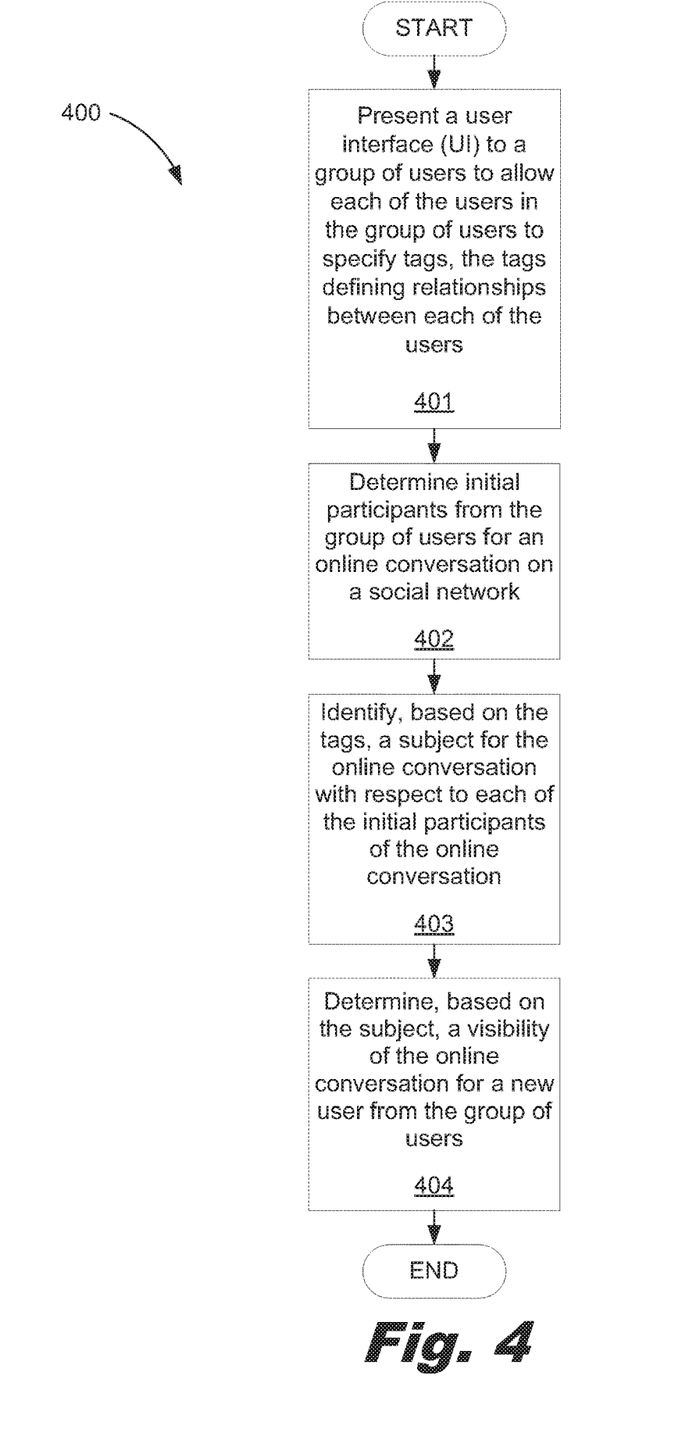
FIG. 4 is a flowchart of an example of a method for determining a visibility of an online conversation for a new participant, according to one example of principles described herein.

FIG. 4 is a flowchart of an example of a method for determining a visibility of an online conversation for a new participant, according to one example of principles described herein. In one example, the method (400) may be executed by the system (100) of FIG. 1. In other examples, the method (400) may be executed by other systems such as system 200, system 600, or system 700. The method (400) includes presenting (401) a UI to a group of users to allow each of the users in the group of users to specify tags, the tags defining relationships between each of the users, determining (402) initial participants from the group of users for an online conversation on a social network, identifying (403), based on the tags, a subject for the online conversation with respect to each of the initial participants of the online conversation, and determining (404), based on the subject, a visibility of the online conversation for a new participant from the group of users.

As mentioned above, the method (400) includes presenting (401) a UI to a group of users to allow each of the users in the group of users to specify tags, the tags defining relationships between each of the users. For example, the UI may include a number of drop down boxes. The drop down boxes allows the users to select predefined tags. The UI may include a number of radio buttons. By selecting the radio buttons, the radio buttons allow the user to select a predefined tag. The UI may include a text box. The text box allows the users to manually define the tags. The UI may include a submit button. Once the user has specified the tags, the user may select on the submit button. Once the submit button is selected, the tags are uploaded to a social network for user by the method (400).

While this example has been described with reference to the method (400) utilizing a UI for the user to specify the tags, the method (400) may use other techniques. For example, the method (400) may utilize an analytics engine to determine the tags. The analytics engine may analyze information from a user's profile page, an online conversation, or information shared between users to determine the tags.

As mentioned above, the method (400) includes determining (402) initial participants from the group of users for an online conversation on a social network. The method (400) may determine the initial participants based on who initiated the online conversation. The method (400) may determine the initial participants based on who is tagged in the online conversation.

As mentioned above, the method (400) includes identifying (403), based on the tags, a subject for the online conversation with respect to each of the initial participants of the online conversation. The subject may be viewed from the perspective of each of the initial participants. For example, the subject from the perspective of user A may be work for the online conversation. However, the subject from the perspective of user B may be company X for the online conversation.

As mentioned above, the method (400) includes determining (404), based on the subject, a visibility of the online conversation for a new participant from the group of users. The visibility may include permitting the new participant to access the online conversation, restricting the new participant from accessing the online conversation, or reprioritizing the online conversation for the new participant.

As the participants, such as the initial participants and new participants, join and or leave the online conversation, the method (400) may repeat. As a result, the method (400) may constantly determine initial participants, identify the subjects from each of the user's perspective, and determine a visibility for new participants.

Figure 5:
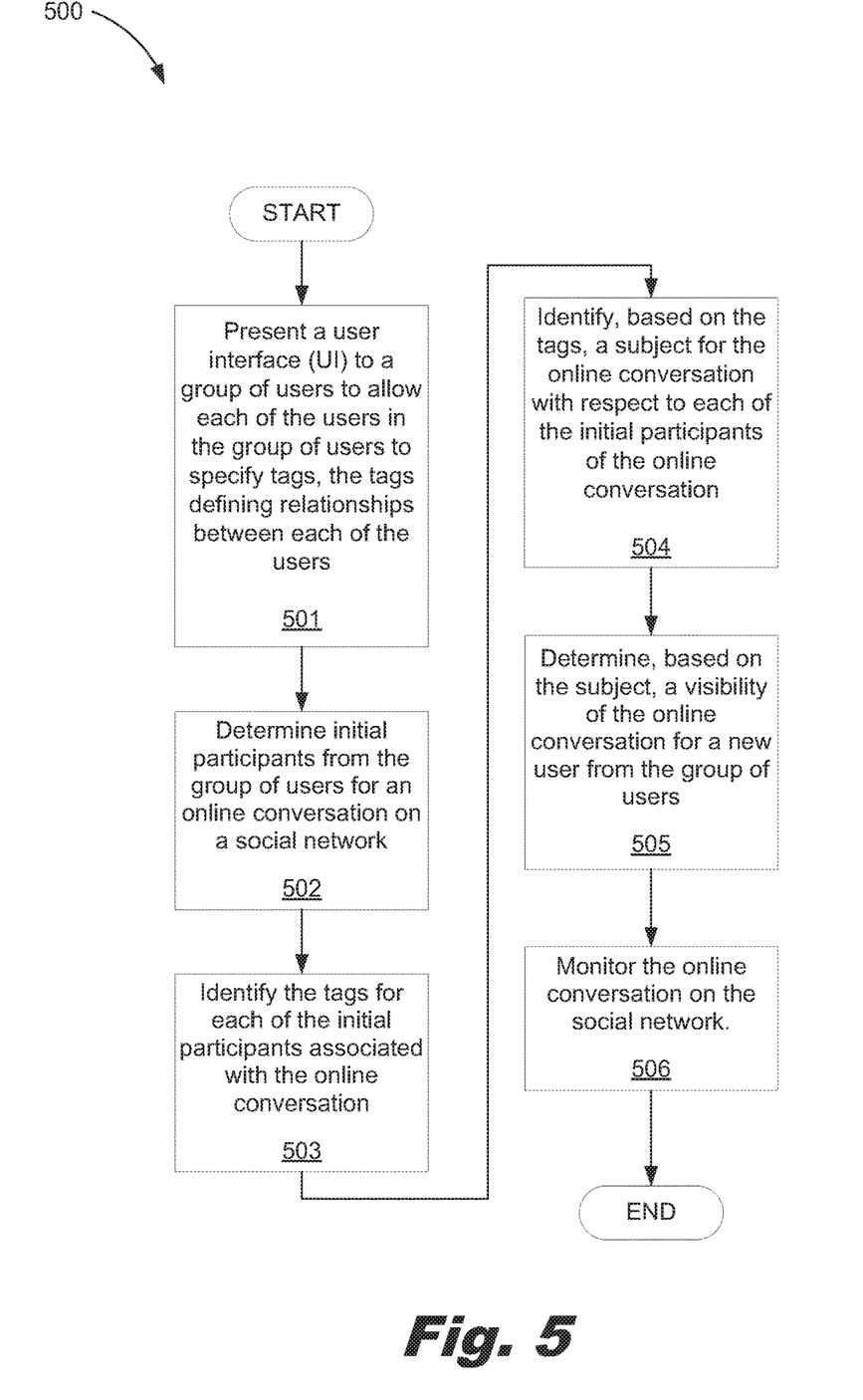
FIG. 5 is a flowchart of an example of a method for determining a visibility of an online conversation for a new participant, according to one example of principles described herein.

FIG. 5 is a flowchart of an example of a method for determining a visibility of an online conversation for a new participant, according to one example of principles described herein. In one example, the method (500) may be executed by the system (100) of FIG. 1. In other examples, the method (500) may be executed by other systems such as system 200, system 600, or system 700. The method (500) includes presenting (501) a UI to a group of users to allow each of the users in the group of users to specify tags, the tags defining relationships between each of the users, determining (502) initial participants from the group of users for an online conversation on a social network, identifying (503) the tags for each of the initial participants associated with the online conversation, identifying (504), based on the tags, a subject for the online conversation with respect to each of the initial participants of the online conversation, determining (505), based on the subject, a visibility of the online conversation for a new participant from the group of users, and monitoring (506) the online conversation on the social network.

As mentioned above, the method (500) includes identifying (503) the tags for each of the initial participants associated with the online conversation. The method (500) may accesses the social network to identifying the tags for each of the initial participants associated with the online conversation.

As mentioned above, the method (500) includes monitoring (506) the online conversation on the social network. If the online conversation is modified as described above, the initial participants may be adjusted. As a result, the visibility of the new participant may be modified.

Figure 6:
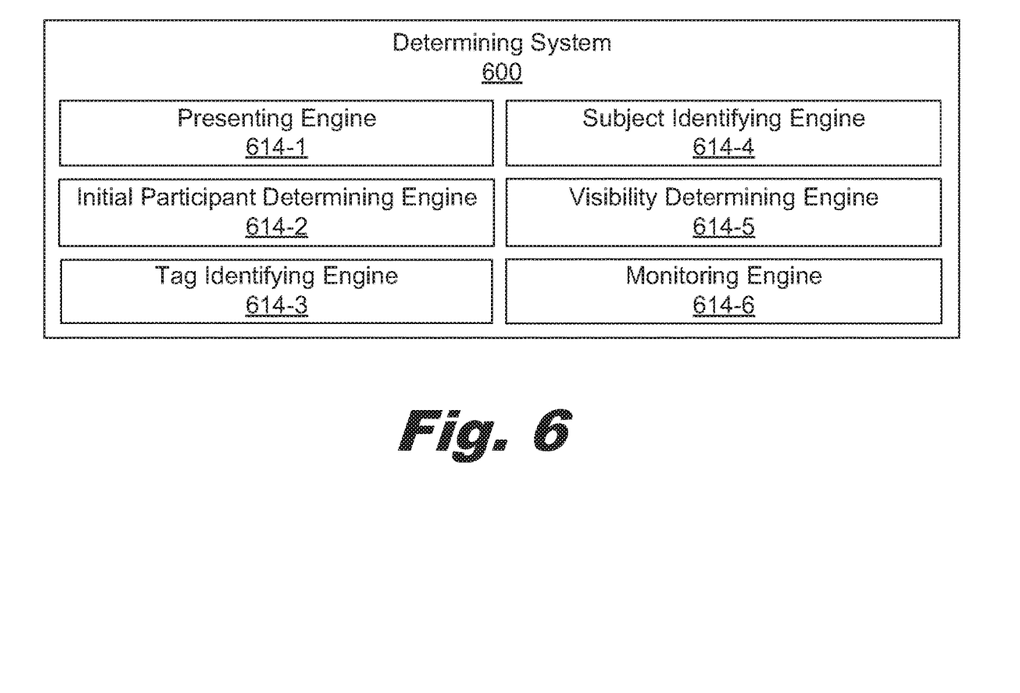
FIG. 6 is a diagram of an example of a determining system, according to the principles described herein.

FIG. 6 is a diagram of a determining system, according to one example of principles described herein. The determining system (600) includes a presenting engine (614-1), an initial participant determining engine (614-2), a tag identifying engine (614-3), a subject identifying engine (614-4), a visibility determining engine (614-5), and a monitoring engine (614-6). The engines (614) refer to a combination of hardware and program instructions to perform a designated function. Alternatively, the engines (614) may be implemented in the form of electronic circuitry (e.g., hardware). Each of the engines (614) may include a processor and memory. Alternatively, one processor may execute the designated function of each of the engines (614). The program instructions are stored in the memory and cause the processor to execute the designated function of the engine.

The presenting engine (614-1) presents a UI to a group of users to allow each of the users in the group of users to specify tags, the tags defining relationships between each of the users. The presenting engine (614-1) presents the UI to a user at creation of a user account. The presenting engine (614-1) presents the UI when a social connection is made.

The initial participant determining engine (614-2) determines initial participants from the group of users for an online conversation on a social network. The initial participant determining engine (614-2) determines initial participants from the group of users for the online conversation on the social network when the online conversation is initiated. The initial participant determining engine (614-2) determines initial participants from the group of users for the online conversation on the social network when the online conversation is modified.

The tag identifying engine (614-3) identifies the tags for each of the initial participants associated with the online conversation. The tag identifying engine (614-3) identifies one tag for each of the initial participants associated with the online conversation. The tag identifying engine (614-3) identifies several tags for each of the initial participants associated with the online conversation.

The subject identifying engine (614-4) identifies, based on the tags, a subject for the online conversation with respect to each of the initial participants of the online conversation. The identifying engine (614-4) identifies, based on the tags, one subject from each of the user's perspective. The identifying engine (614-4) identifies, based on the tags, several subjects from each of the user's perspective.

The visibility determining engine (614-5) determines, based on the subject, a visibility of the online conversation for a new participant from the group of users. The visibility determining engine (614-5) determines the visibility based on a number of initial participants.

The monitoring engine (614-6) monitors the online conversation on the social network. The monitoring engine (614-6) monitors one online conversation on the social network. The monitoring engine (614-6) monitors several online conversations on the social network.

Figure 7:
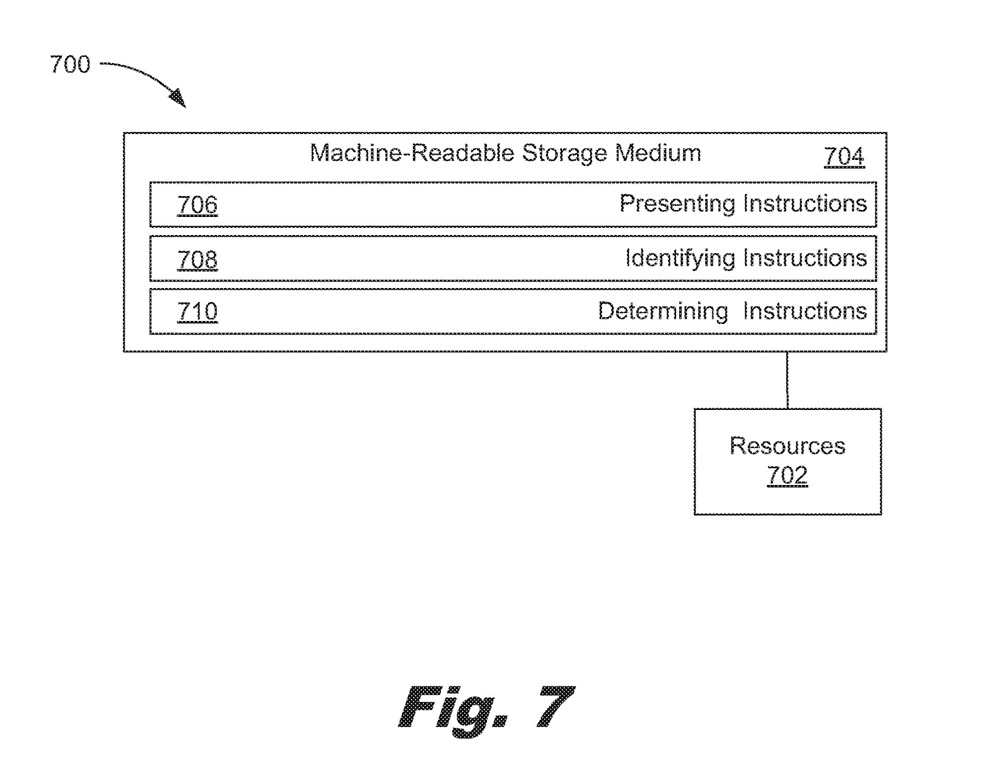
FIG. 7 is a diagram of an example of a determining system, according to the principles described herein.

FIG. 7 is a diagram of a determining system, according to one example of principles described herein. In this example, the determining system (700) includes resource(s) (702) that are in communication with a machine-readable storage medium (704). Resource(s) (702) may include one processor. In another example, the resource(s) (702) may further include at least one processor and other resources used to process instructions. The machine-readable storage medium (704) represents generally any memory capable of storing data such as instructions or data structures used by the determining system (700). The instructions shown stored in the machine-readable storage medium (704) include presenting instructions (706), identifying instructions (708), and determining instructions (710).

The machine-readable storage medium (704) contains computer readable program code to cause tasks to be executed by the resource(s) (702). The machine-readable storage medium (704) may be tangible and/or physical storage medium. The machine-readable storage medium (704) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The presenting instructions (706) represents instructions that, when executed, cause the resource(s) (702) to present a UI to a group of users to allow each of the users in the group of users to specify tags, the tags defining relationships between each of the users. The identifying instructions (708) represents instructions that, when executed, cause the resource(s) (702) to identify, based on the tags, a subject for an online conversation with respect to each initial participant of the online conversation. The determining instructions (710) represents instructions that, when executed, cause the resource(s) (702) to determine, based on the subject, a visibility of the online conversation for a new participant from the group of users.

Further, the machine-readable storage medium (704) may be part of an installation package. In response to installing the installation package, the instructions of the machine-readable storage medium (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (702) and the machine-readable storage medium (704) are located within the same physical component, such as a server, or a network component. The machine-readable storage medium (704) may be part of the physical component's main memory, caches, registers, non-volatile memory, or elsewhere in the physical component's memory hierarchy. Alternatively, the machine-readable storage medium (704) may be in communication with the resource(s) (702) over a network. Further, the data structures, such as the libraries, may be accessed from a remote location over a network connection while the programmed instructions are located locally. Thus, the determining system (700) may be implemented on a user device, on a server, on a collection of servers, or combinations thereof.

The determining system (700) of FIG. 7 may be part of a general purpose computer. However, in alternative examples, the determining system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method for determining a visibility of an online conversation for a new participant, the method comprising: presenting a user interface (UI) to a group of users to allow each of the users in the group of users to specify tags, the tags defining relationships between each of the users;

determining initial participants from the group of users for an online conversation on a social network, the online conversation created by at least one member of the initial participants to communicate among each other;

identifying, based on the tags, a subject for the online conversation with respect to each of the initial participants of the online conversation; the tags being assigned to each of the initial participants associated with the online conversation by at least one of the users in the group of users;

operating in a tolerant mode or strict mode depending on a number of the initial participants; and determining, based on the subject and the operating, a visibility of the online conversation for a new participant from the group of users.

2. The method of claim 1, in which the visibility comprises permitting the new participant to access the online conversation, restricting the new participant from accessing the online conversation, or reprioritizing the online conversation for the new participant.

3. The method of claim 1, in which the tags are specific to each of the users in the group of users.

4. The method of claim 1, further comprising identifying the tags for each of the initial participants associated with the online conversation.

5. The method of claim 1, in which the tolerant mode allows the new participant to access the online conversation if at least one of the tags of at least one of the initial participants defines a subject for which the new participant is also tagged.

6. The method of claim 1, in which the strict mode allows the new participant to access the online conversation if at least one of the tags from all of the initial participants for the new participant matches the subject of the online conversation.

7. The method of claim 1, in which the visibility is further based on the new participant being socially connected to each of the initial participants or the new participant and a subgroup of the initial participants having a common tag.

8. The method of claim 1, further comprising monitoring the online conversation on the social network.

9. A system for determining a visibility of an online conversation for a new participant, the system comprising:

a processor programmed to present a user interface (UI) to a group of users to allow each of the users in the group of users to specify and assign tags to initial participants associated with the online conversation, the tags defining relationships between each of the users;

determine initial participants from the group of users engaged in an online conversation initiated by at least one of the initial participants on a social network;

identify the tags assigned to each of the initial participants associated with the online conversation by at least one of the users in the group of users;

identify, based on the tags defining the relationships between each of the users, a subject for the online conversation with respect to each of the initial participants of the online conversation;

operate in a tolerant mode or strict mode depending on a number of the initial participants;

determine, based on the subject and the operating, a visibility of the online conversation for a new participant from the group of users; and monitor the online conversation on the social network.

10. The system of claim 9, in which the visibility comprises permitting the new participant to access the online conversation, restricting the new participant from accessing the online conversation, or reprioritizing the online conversation for the new participant.

11. The system of claim 9, in which the tags are specific to each of the users in the group of users.

12. The system of claim 9, in which the tolerant mode allows the new participant to access the online conversation if at least one of the tags of at least one of the initial participants defines a subject for which the new participant is also tagged.

13. The system of claim 9, in which the strict mode allowing the new participant to access the online conversation if at least one of the tags from all of the initial participants for the new participant matches the subject of the online conversation.

14. A machine-readable storage medium encoded with instructions for determining a visibility of an online conversation for a new participant, the instructions executable by a processor of a system to cause the system to:

present a user interface (UI) to a group of users to allow each of the users in the group of users to specify tags, the tags defining relationships between each of the users;

determine initial participants from the group of users engaged in an online conversation initiated by at least one of the initial participants on a social network;

identify, based on the tags defining characterizing relationships between each of the users, a subject for the online conversation with respect to each initial participant of the online conversation, the tags being assigned to each of the initial participants associated with the online conversation by at least one of the users in the group of users;

operate in a tolerant mode or strict mode depending on a number of the initial participants; and determine, based on the subject and the operating, a visibility of the online conversation for a new participant from the group of users.

15. The machine-readable storage medium of claim 14, further comprising instructions that, when executed, cause the processor to identify the tags for each of the initial participants associated with the online conversation.

16. The machine-readable storage medium of claim 14, further comprising instructions that, when executed, cause the processor to monitor the online conversation on a social network.

17. The machine-readable storage medium of claim 14, in which the visibility comprises permitting the new participant to access the online conversation, restricting the new participant from accessing the online conversation, or reprioritizing the online conversation for the new participant.

18. The machine-readable storage medium of claim 14, in which the tolerant mode allows the new participant to access the online conversation if at least one of the tags of at least one of the initial participants defines a subject for which the new participant is also tagged.

19. The machine-readable storage medium of claim 14, in which the strict mode allows the new participant to access the online conversation if at least one of the tags from all of the initial participants for the new participant matches the subject of the online conversation.

20. The machine-readable storage medium of claim 14, in which a threshold number of participants is two initial participants.

* * * * *